United States Patent
Matusek et al.

(10) Patent No.: US 8,240,332 B1
(45) Date of Patent: Aug. 14, 2012

(54) INTERNALLY MOUNTED/EXTERNALLY ACCESSIBLE FUEL SUPPLY UNIT FOR A FUEL SUMP

(75) Inventors: Steven M. Matusek, Olathe, KS (US); Ronnie Joe Miller, Overland Park, KS (US)

(73) Assignee: Aeromotive, Inc., Lenexa, KS (US)

( * ) Notice: Subject to any disclaimer, the term of this patent is extended or adjusted under 35 U.S.C. 154(b) by 635 days.

(21) Appl. No.: 12/426,376

(22) Filed: Apr. 20, 2009

(51) Int. Cl.
*B01D 47/00* (2006.01)
*B01D 35/153* (2006.01)
*F02M 37/04* (2006.01)

(52) U.S. Cl. .................. 137/565.17; 123/509; 210/234; 210/235

(58) Field of Classification Search .............. 137/549, 137/625.31, 565.12, 544, 565.17, 565.34; 123/509, 510, 497, 495; 210/234–235, 172.1–172.3, 210/248, 258, 416.4, 418, 435, 459, 460
See application file for complete search history.

(56) References Cited

U.S. PATENT DOCUMENTS

| | | | | |
|---|---|---|---|---|
| 4,367,144 A | * | 1/1983 | Peters et al. | 210/234 |
| 4,529,514 A | | 7/1985 | Gruett | |
| 4,529,515 A | | 7/1985 | Selz | |
| 4,615,812 A | | 10/1986 | Darling | |
| 4,946,047 A | * | 8/1990 | Kurokawa et al. | 210/234 |
| 5,195,494 A | * | 3/1993 | Tuckey | 123/514 |
| 5,607,582 A | | 3/1997 | Yamazaki et al. | |
| 5,826,854 A | * | 10/1998 | Janvrin et al. | 251/149.9 |
| 5,846,417 A | * | 12/1998 | Jiang et al. | 210/235 |
| 6,158,461 A | * | 12/2000 | Frank et al. | 137/574 |
| 6,283,731 B1 | * | 9/2001 | Yoshioka | 417/423.3 |
| 6,746,603 B2 | * | 6/2004 | Harvey et al. | 210/234 |
| 6,807,948 B2 | * | 10/2004 | Kanamaru et al. | 123/495 |
| 6,858,134 B2 | | 2/2005 | Yates | |
| 6,926,827 B2 | | 8/2005 | Gruca et al. | |
| 6,966,306 B2 | * | 11/2005 | Sawert et al. | 123/509 |
| 7,147,772 B2 | | 12/2006 | Fritze | |
| 7,407,148 B2 | | 8/2008 | Bassett et al. | |
| 2005/0000876 A1 | | 1/2005 | Knight | |
| 2006/0260696 A1 | * | 11/2006 | Leymarie et al. | 137/565.17 |
| 2007/0170103 A1 | * | 7/2007 | Fick | 210/232 |

* cited by examiner

*Primary Examiner* — John Rivell
*Assistant Examiner* — David Colon Morales
(74) *Attorney, Agent, or Firm* — Erickson, Kernell, Derusseau & Kleypas, LLC

(57) ABSTRACT

A fuel supply system including a filter removably securable within a filter housing mounted within a fuel tank and a pump removably securable within a pump housing mounted within the fuel tank and interconnected by a pipe. The filter housing includes an inner housing rotatably mounted within an outer housing. Alignable inlet openings and outlet passageways are formed in the inner and outer housings. A removable plug for closing an access opening to the inner housing includes lugs for engaging mating recesses in the inner housing such that rotation of the plug rotates the inner housing relative to the outer housing for rotating the inner housing between an aligned and misaligned orientation relative to the outer housing to control the flow of fluid through the filter housing.

9 Claims, 6 Drawing Sheets

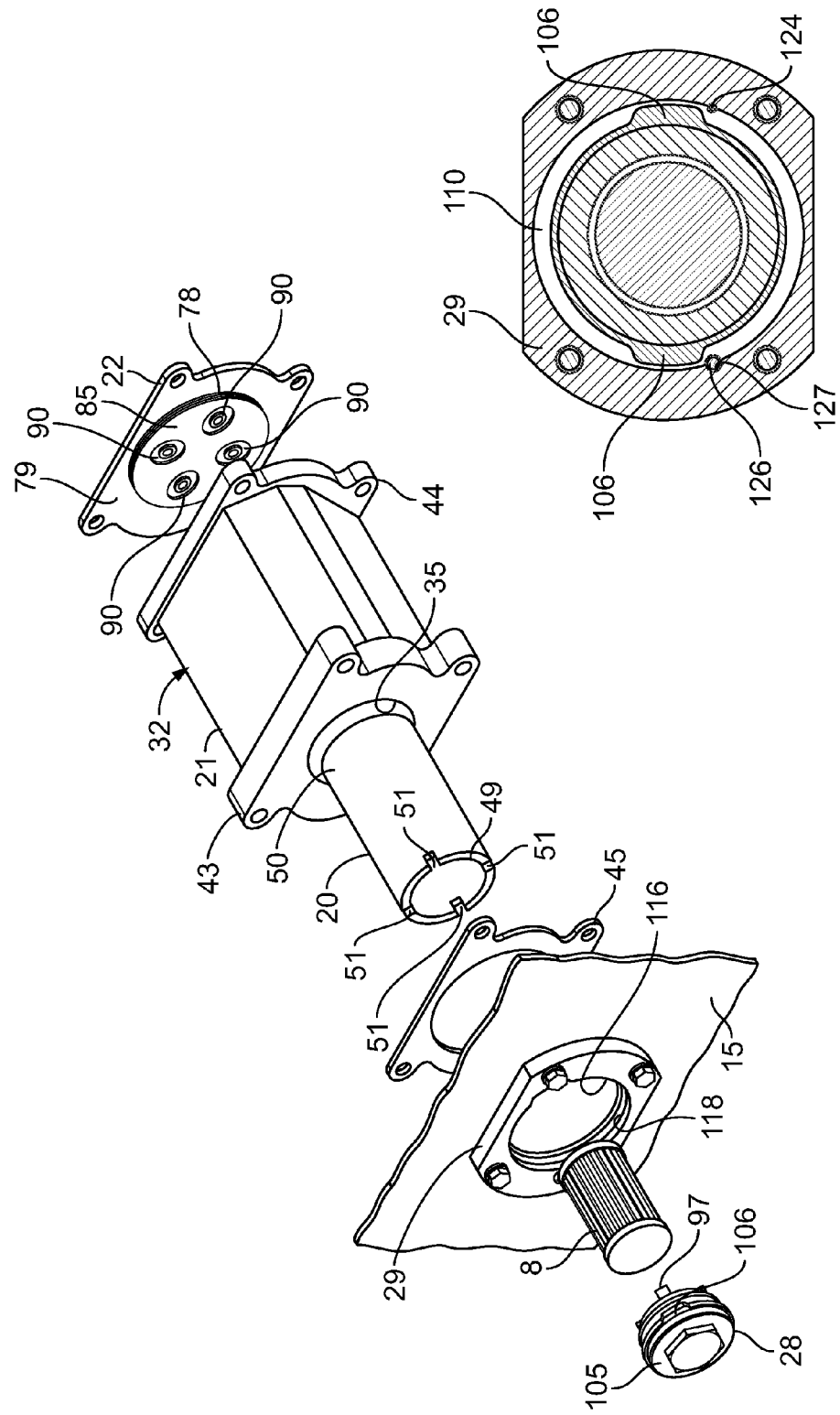

INTERNALLY MOUNTED/EXTERNALLY ACCESSIBLE FUEL SUPPLY UNIT FOR A FUEL SUMP

BACKGROUND OF THE INVENTION

1. Field of the Invention

This invention relates to fuel filters and pumps submerged in the sump of a fuel tank to ensure adequate fuel supply through the filter to prevent pump cavitation and to permit relatively quick and easy replacement of the filter element. It is particularly well adapted for use with fuel supply lines with an increased pumping capacity in automotive applications and more particularly for race cars.

2. Description of the Related Art

High performance street cars and race cars tend to have engines which produce over 500 horse power (HP) and even over 1000 HP. Engines capable of generating over 500 HP usually require high efficiency fuel pumps and filtering systems. Failure to provide a sufficiently efficient filtering system for a high efficiency fuel pump will result in the development of a vacuum or low pressure area at the inlet of the pump causing cavitation of the pump at normal operating temperatures resulting in a loss of fuel pressure and flow through the engine. Such operating conditions may also result in a build up of excess heat in the fuel pump due to friction, causing damage to or possibly failure of the fuel pump.

To ensure quality and efficient filtering in high performance or racing applications, the fuel filter is replaced or cleaned much more frequently than under normal driving conditions including possibly during a race. However, adequate safeguards must be in place to minimize leaks of the flammable and toxic fuel and ensure the safe operation of the fuel supply system. Therefore, there is a need for a fuel supply system which can combine high efficiency with very simple, quick and safe replacement of the filtering element and if necessary the fuel pump, especially in racing applications where the filtering element may be replaced often to ensure quality filtering. Currently available fuel supply systems do not adequately address all these high performance characteristics in one compact fuel supply unit.

The pressure drop across the fuel filter is indicative of its efficiency with the smallest pressure drop possible being preferred. The pressure drop across the filtering element may be reduced by increasing its surface area which for most filters may be accomplished by increasing the quantity of filter pleats. The remaining pressure drop in the filtering system is usually caused by narrow passageways in the fuel supply inlet and outlet.

One way to reduce the pressure drop in the filtering system is to submerge the filter into the reservoir or fluid supply tank. In race car applications, this means submerging the fuel filter in the fuel tank. However, submerging the fuel filter in the fuel tank requires additional safeguards to prevent fuel from leaking out of the tank when the filter is changed.

U.S. Pat. No. 5,607,582 to Yamazaki et al. discloses a Filter System for Liquids. It contains a round base subassembly with inlet and outlet openings for fluid supply and a round filter housing subassembly attached to the base. The base subassembly consists of a round plate or disc with inlet and outlet openings on its upper surface. An intermediate round disk is mounted on the upper surface of the disc of the base assembly with inlet and outlet openings formed in the intermediary disk. The disks can rotate around their common axes to bring their inlet and outlet openings into flow communication or misalign them to cut off fluid flow therebetween. The filter housing subassembly consists of a cylindrical sleeve with two flanges on both ends. A bottom flange of the housing is attached to the round base plate by bolts and the top flange is for attachment of a lid. A round filter unit may be inserted into the sleeve and held in place by the housing lid. A thin round rotatable disk with inlet and outlet openings is attached to the bottom surface of the filter unit which contains inlet and outlet openings as well. This pair of inlet and outlet openings on the bottom of the filter subassembly may be aligned or misaligned in the same way as in base subassembly. By rotating the filtering unit 90° and using a 'pin in slot' engagement between the filter housing subassembly and the base subassembly all four corresponding inlet and outlet openings may be brought into flow communication when the filter is in an operating state. By removing the housing lid and rotating the filter unit inside the housing 90° in an opposite direction, each pair of inlet and outlet openings in the base and filter housing subassemblies are misaligned or advanced to a closed position. With the openings in the base subassembly misaligned with the openings in the filter housing subassembly, the filter unit may be removed from the filter housing. The inlet and outlet openings of the separated filter unit will remain in a misaligned (closed) position during transportation for disposal, preventing leaks of fluid trapped inside the unit. In the same manner, the base subassembly shuts off the inlet and outlet openings therethrough until a new filter unit installed.

Since the filter assembly disclosed in the Yamazaki et al. '582 patent is installed in the fluid supply line, an unavoidable pressure drop in the inlet and outlet lines of the filter system will cause the same pumping problem for fuel supply systems as discussed above. Furthermore, the Yamazaki filter unit utilizes only one inlet opening and one outlet opening through the base and filter housing subassemblies, which restricts the fluid flow through the filter. The area of inlet and outlet openings of both subassemblies is limited since they must be significantly spaced apart in order to provide sufficient surface area for these openings to be rotated between aligned and misaligned positions.

U.S. Pat. No. 4,367,144 to Peters et al. discloses a filter including a cylindrical casing with fluid inlet openings extending therethrough proximate a distal end and fluid outlet openings extending therethrough proximate a filter inlet end. A removable filter element is slid into and out of the casing through an opening formed in the filter inlet end. Spring biased shutters are normally biased in a position extending over the fluid inlet and outlet openings. As a filter is slid all of the way into the casing it engages the spring biased shutters and advances them to an open position. Upon removal of the filter element from the casing for replacement, the shutters are urged by the springs back across and in a closed alignment with the fluid inlet and outlet openings to prevent the flow of fluid into the casing.

One drawback of the filter assembly of the Peters et al. '144 patent is that the if the shutters malfunction and become stuck in the open position, fluid can leak back out of the fluid sump, through the fluid inlet openings and out the open end of the filter housing. Such a malfunction can be particularly problematic if the filter is used for filtering fuel or other toxic or flammable liquids.

There remains a need for an efficient and safe filtering and pumping system for fuel supply and especially for racing and high performance applications.

SUMMARY OF THE INVENTION

The present invention comprises a fuel supply system which is applicable for use with vehicles and in particular stock cars. The fuel supply system comprises a filter unit and a pump unit both positioned within the sump of a fuel tank so that the filter and pump are submerged in the fuel and continuously supplied with fuel until the fuel tank is empty. The filter unit includes a filter housing assembly comprising an outer housing and an inner housing with a fuel filter chamber formed in the inner housing. The inner housing is rotatably mounted within the outer housing. A replaceable filter is removably positioned within the chamber in the inner housing. A pair of inlet openings are formed in the sidewall of both the outer housing and the inner housing, and the inner housing is rotatable relative to the outer housing to align or misalign the inlet openings in the inner housing with the inlet openings in the outer housing.

When the inlet openings are aligned, fuel enters the fuel filter chamber through the aligned openings. Fluid flows through the filtering element in the fuel filter chamber and exits the housing through an outlet centrally located in a distal end of the inner housing. The inner housing outlet branches outward to form a plurality of outlet passages which are aligned with outlet passages in an end cap extending across a distal end of the outer housing. The outlet passages in the end cap of the outer housing converge to form a single fluid outlet for the filter housing assembly. When the inner housing is rotated to misalign the inlet openings in the inner and outer housings, the outlet passages formed in the inner housing are similarly misaligned with the outlet passages in the outer housing end cap to prevent the flow of fuel therethrough.

An access opening is formed in a sidewall of the sump to allow replacement of the filter element therethrough. A mounting flange, formed on an access end of the outer housing of the filter assembly, is mounted to an inner surface of the sump sidewall around the access opening. An access end of both the outer housing and inner housing are open to allow access therethrough and into the filter chamber.

A plug assembly is provided for covering the access opening for the filter chamber in the inner housing. The plug assembly includes a plug and a plug retaining ring which is bolted to an outer surface of the sump sidewall opposite the outer housing mounting flange and around the access opening. The plug includes a pair of radially outward projecting ears or tabs which engage bayonet slots formed in an inner surface of the plug retaining ring. A tool engagement member, such as a hex head or a slot for receiving a driver is formed on an outer surface or side of the plug to facilitate rotation of the plug and a plurality of lugs are formed on an inner end of the plug for engaging mating lug receivers formed in an access end of the inner housing. Engagement of the lugs in the lug receivers causes rotation of the inner housing relative to the outer housing when the plug is rotated.

The plug is installed in the retaining ring by aligning the ears of the plug with inlets to the bayonet slots, moving the cap toward the inner housing such that the ears advance into the slots and then rotating the plug in a selected direction to advance the cap ears along the slots and away from the bayonet slot inlets so that the plug cannot be removed without rotating the plug in an opposite direction to align the plug ears with the bayonet slot inlets.

To replace the filter element, the plug is rotated to align the plug ears with the bayonet slot inlets and allowing removal of the plug from the plug retaining ring. Simultaneously, the lugs on the plug rotate the inner housing relative to the outer housing moving the inlet openings in the inner housing out of alignment with the corresponding openings in the outer housing. The outlet passages in the distal end of the inner housing are also moved out of alignment with the outlet passages in the outer housing end cap. Misalignment of the respective outlet passages cuts off fluid flow into the inner housing, thereby allowing the plug and the filter element to be removed without fluid running out of the sump or out of the downstream fuel supply line.

Once a new filtering element is inserted into the filter chamber in the inner housing, the plug is reinserted in the plug retainer ring with the lugs on the plug engaging the lug receivers in the inner housing. The plug is then rotated to align the inlet openings in the inner and outer housings and the outlet passages in the inner housing and the outer housing end cap. The filter unit and pump are then ready for operation.

The pump unit consists of a pump, a pump housing mounted within the sump and a removable end cap for removably securing the pump within the pump housing mounted within the sump. A short section of pipe connects the filter unit outlet to an inlet to the pump housing. In operation, the pump draws fluid out of the sump, through the aligned inlets in the filter unit inner and outer housings, through the filter and out the aligned outlet passages in the filter unit inner and outer housings, through the pipe, into the pump housing, through the pump and out through a pump discharge line extending through the removable end cap. The pump may be easily removed from the pump housing in the sump for maintenance. Normally the pump will only be removed when the filter unit inner and outer housings are in a misaligned position so that fluid flow through the filter unit is cut off and fluid will not flow out of the sump and through the pump housing when the end cap and pump are removed.

BRIEF DESCRIPTION OF THE DRAWINGS

FIG. 6 is an exploded and fragmentary view of the filtering unit mounted to a sump sidewall.

FIG. 7 is a cross-sectional view taken along line 7-7 of FIG. 4.

DETAILED DESCRIPTION OF THE INVENTION

Figure 1:
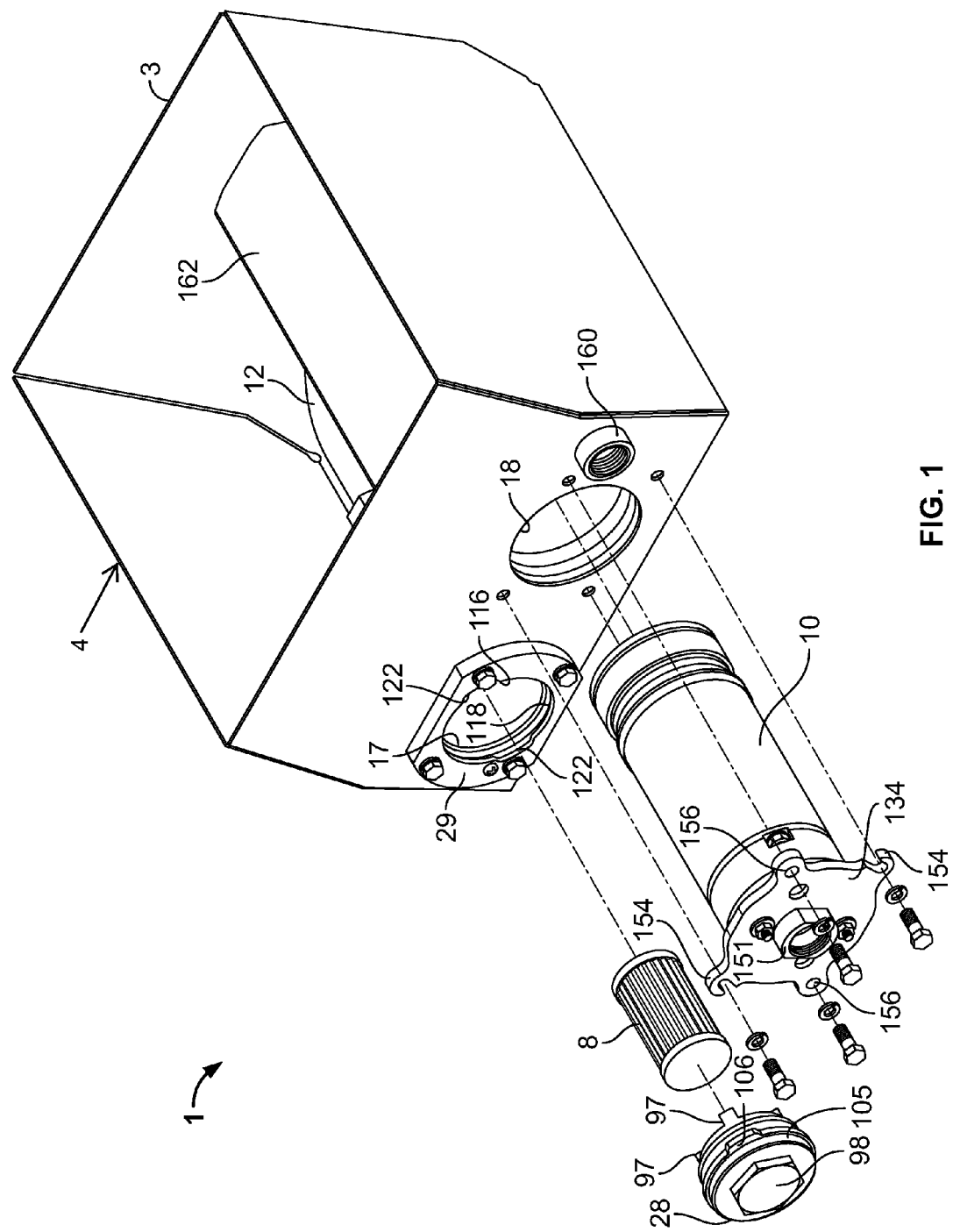
FIG. 1 is a fragmentary and exploded perspective view of a fuel supply system including filtering and pumping units submerged in a sump of a fuel tank.

Referring to the drawings in more detail, the reference numeral 1 refers to a fluid filtering and pumping assembly and more specifically a fuel supply system for an automobile (not shown). The fuel supply system 1 is mounted within a sump 3 of a fuel tank 4 of the automobile. The fuel supply system 1 consists of a filter assembly 7 including a fuel filter 8 and a pump assembly 9 including a fuel pump 10. The filter assembly and the pump assembly are connected together by a pipe or fuel line 12. The sump 3 may be sold with the filter and pump assemblies 7 and 9 and fuel line 12 for modifying an existing fuel tank of an automobile. A hole is cut in the fuel tank 4 and the sump 3 is then welded to the fuel tank, such that the sump 3 may then be considered part of the tank 4. It is to be understood that the fluid filtering and pumping system 1 could be used with various tanks, with or without a separate sump and for pumping a wide variety of fluids.

The filter assembly 7 and pump assembly 9 are mounted to a sidewall 15 of the sump 3 in a manner which allows relatively rapid removal of the fuel filter 8 and the fuel pump 10. Moreover the filter assembly 7 and pump assembly 9 are mounted proximate a floor 16 of the sump 3 so that the filter assembly 7 and pump assembly 9 are submerged in the fuel unless the tank 4 is pumped dry. The sump 3 also functions to help hold fuel around the filtering assembly 7 and pump inlet when the automobile is rounding corners.

More specifically, a filter access opening 17 and a pump access opening 18 are formed in the sump sidewall 15. The filter assembly 7 is mounted to the sump sidewall 15 around the filter access opening 17 so that the filter 8 may be selectively withdrawn and replaced therethrough. Similarly, the pump assembly 9 is mounted to the sump sidewall 15 around the pump access opening 18 so that the pump 10 may be selectively withdrawn and replaced therethrough.

Figure 2:
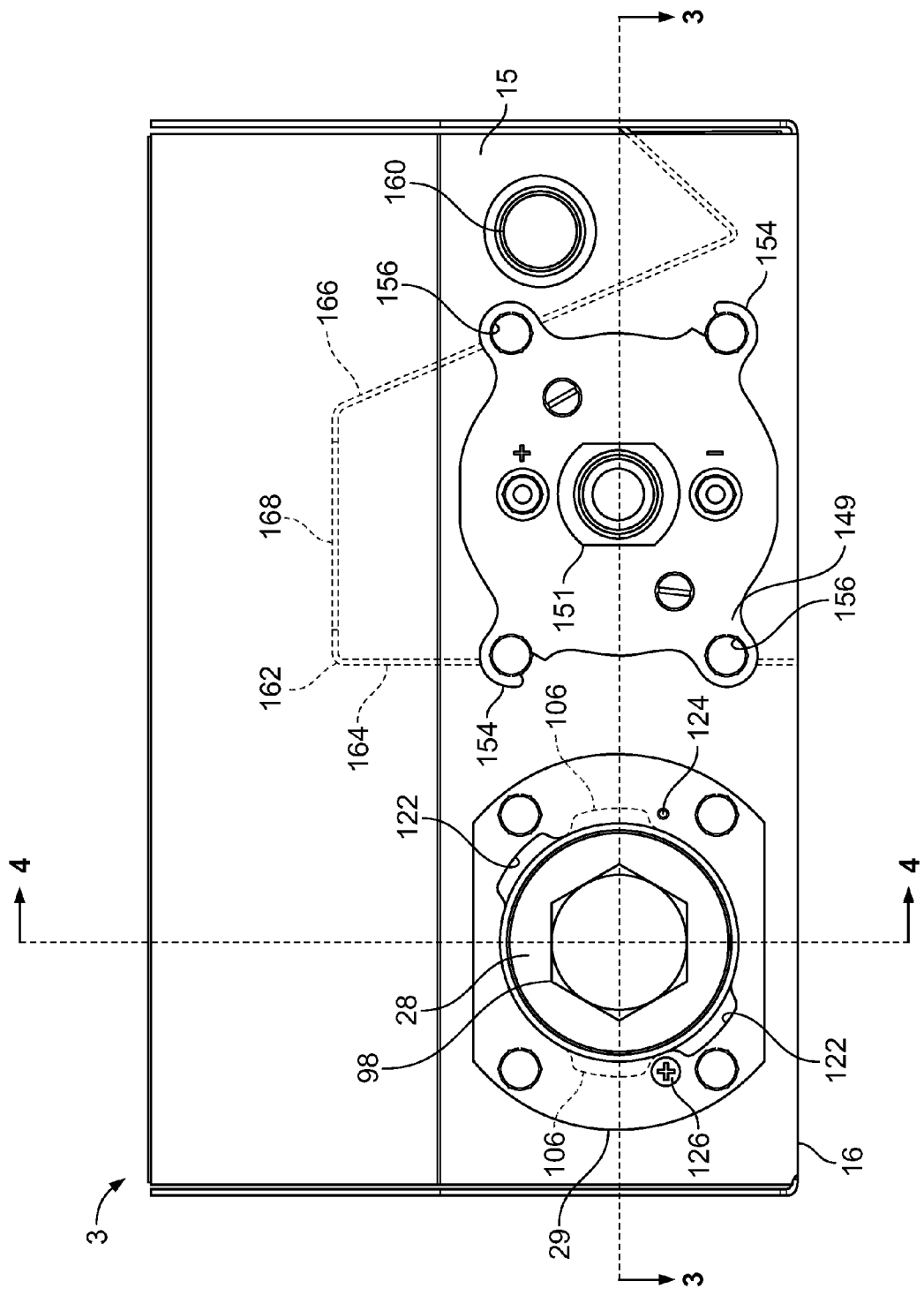
FIG. 2 is an enlarged front plan view of the sump as shown in FIG. 1 with the filtering and pumping units connected thereto and with portions shown in phantom lines.
Figure 3:
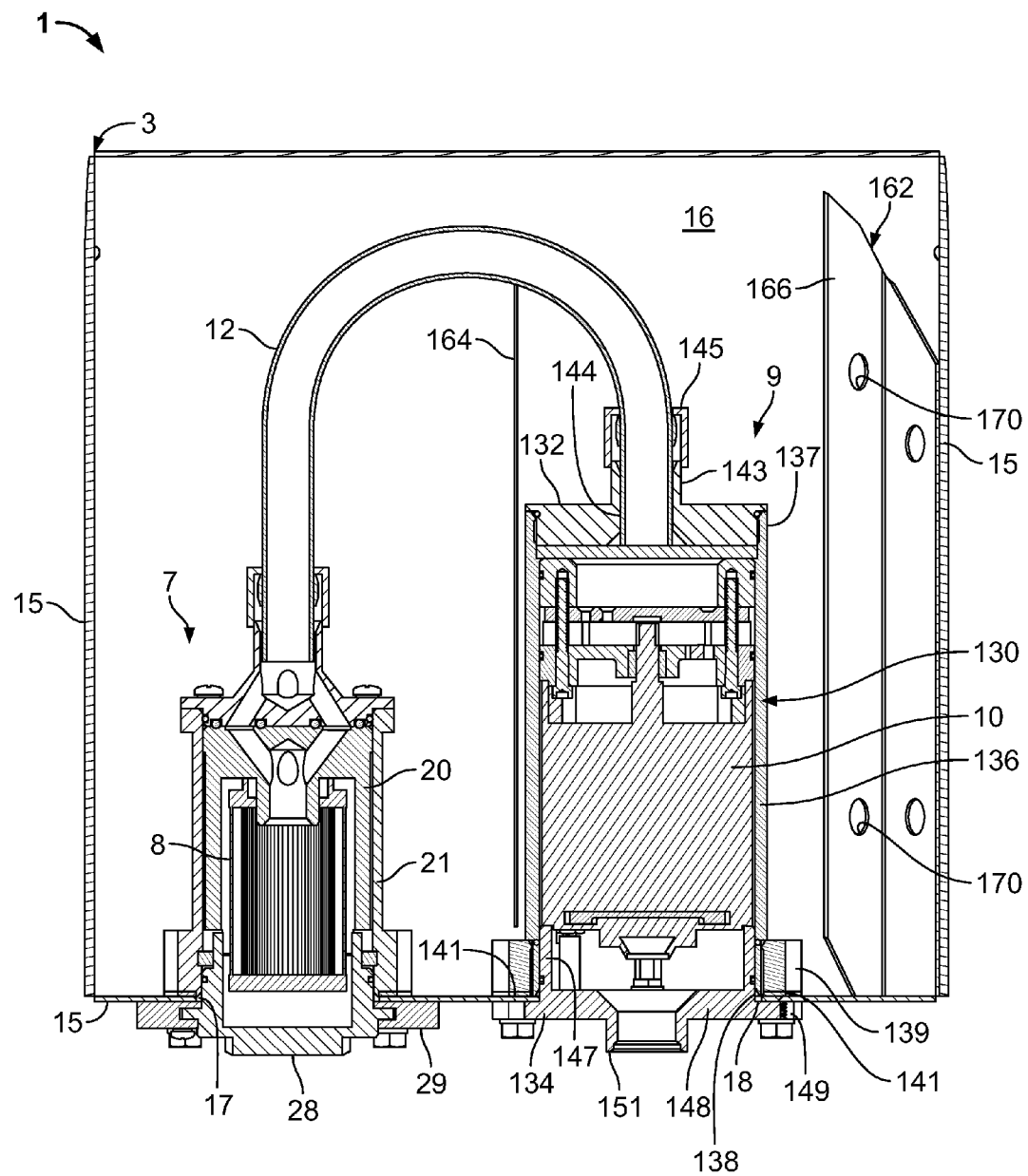
FIG. 3 is a cross-sectional view taken along line 3-3 of FIG. 2.
Figure 4:
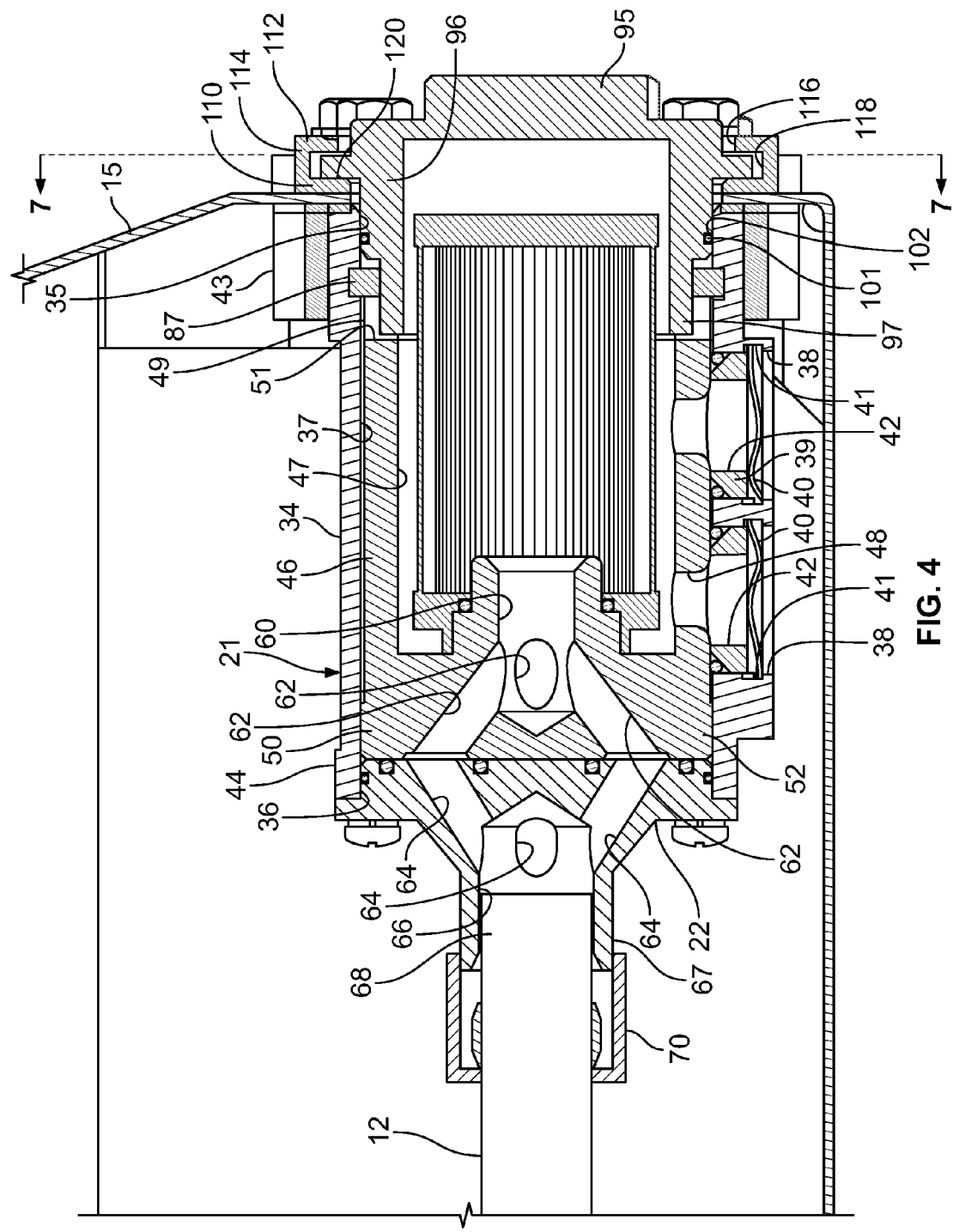
FIG. 4 is a cross-sectional view taken along line 4-4 of FIG. 2 showing an inner housing of the filtering unit rotated into an open flow alignment with an outer housing of the filtering unit.
Figure 5:
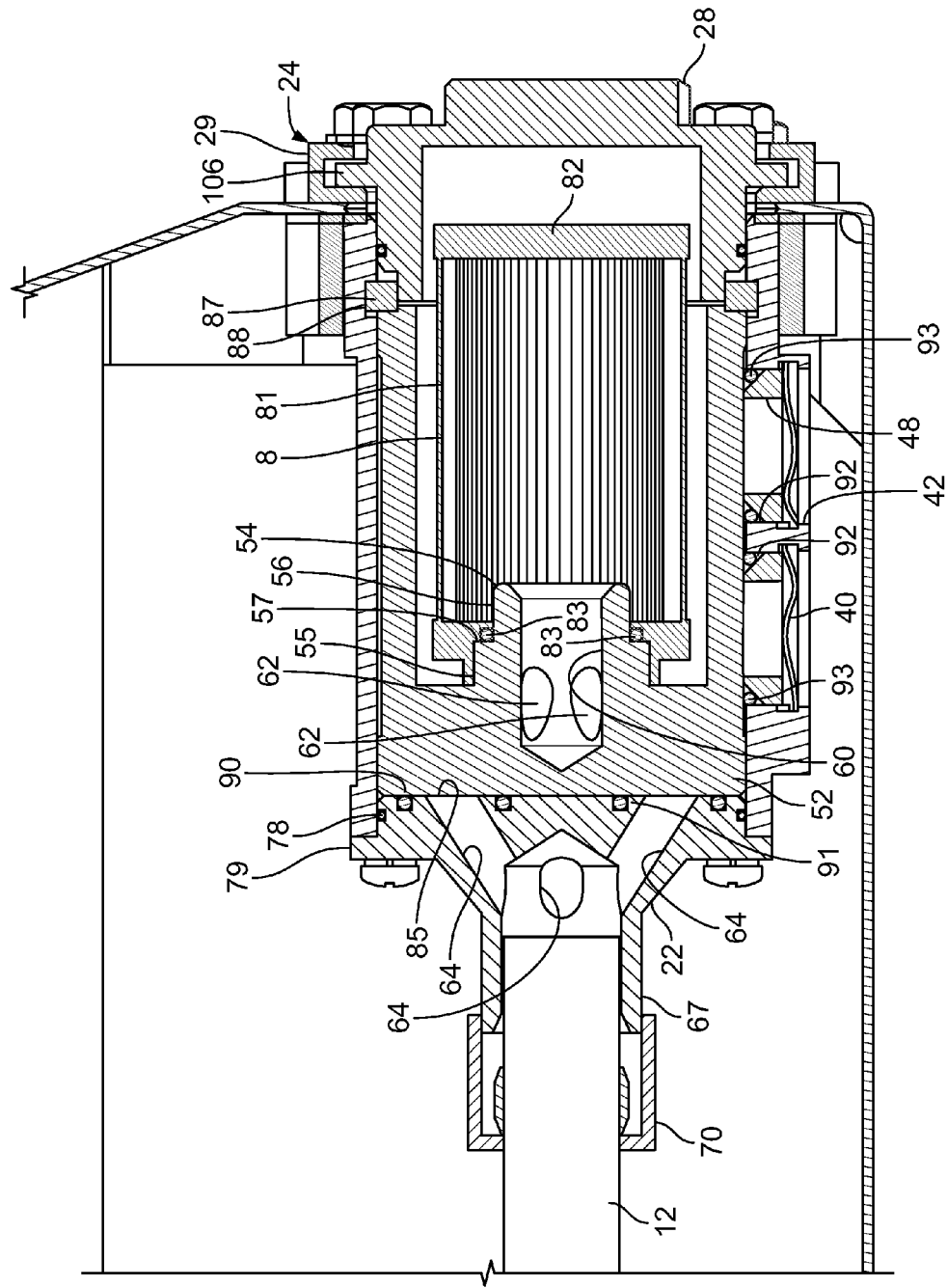
FIG. 5 is a cross-sectional view similar to FIG. 4, showing the inner housing rotated to a closed flow alignment relative to the outer housing.

The filter assembly 7 is shown in more detail in FIGS. 2-4 In addition to the filter 8, the filter assembly 7 includes an inner housing 20 rotatably mounted within an outer housing 21, an outlet end cap 22 and an access end cap 24. As best seen in FIG. 1, the access end cap 24 comprises a plug 28 and a plug retaining ring 29. The outlet end cap 22 may be considered part of the outer housing 21. The plug 28 may also be referred to as a closure member, cap, cover or other synonymous terms.

The outer filter housing 21 includes a main body 32 having a peripheral sidewall 34, open ends 35 and 36 and an axial bore 37 extending therethrough. A pair of inlet opening bores 38 are formed in and extend through the sidewall 34 into the axial bore 37. An annular o-ring support 39 is positioned in each inlet opening bore 38 and held in place by an annular wave spring 40 secured within a recess or groove 41 formed in the outer periphery of the inlet opening bore 38. An inlet opening 42 extends through annular o-ring support 39 and wave spring 41 and within the inlet opening bore 38. First and second mounting flanges 43 and 44 are formed on ends of the outer housing 21 around the open ends 35 and 36 respectively. The first mounting flange 43, extends around the access end 35 of the outer housing 21 and is adapted for mounting the outer housing 21 to an inner surface of the sump sidewall 15, around the filter access opening 17. The plug retaining ring 29 is bolted to the first mounting flange 43 of the outer housing 21 on an opposite side of the sump sidewall 15 in axial alignment with the filter access opening 17. A filter housing gasket 45 is positioned between the first mounting flange 43 and an inner surface of a sump sidewall 15. The outer housing 21 is mounted to the sump sidewall 15 such that the outer housing inlet openings 42 open downward toward the bottom of the sump 3.

The outlet end cap 22 is bolted onto the second or outlet mounting flange 44 to close off the outlet end 36 of the outer housing 21. The outlet end cap 22 also cooperates with the inner housing 20, as discussed hereafter, to selectively direct fluid passing through the filter 8 out of the inner and outer housings 21 and 22 and to the fuel line 12.

The inner housing 20 is cylindrical and sized to fit generally snug within the axial bore 37 of the outer housing 21. The inner housing 20 includes a cylindrical sidewall 46 surrounding a filter receiving chamber 47 with a pair of inlet openings 48 extending through the cylindrical sidewall 46 in communication with the filter receiving chamber 47. The filter receiving chamber 47 extends inward into the inner housing 20 from an open, access end 49 toward an outlet end 50 thereof. A plurality of slots or lug receivers 51, four in the embodiment shown, are formed in the cylindrical sidewall 47 and extend inward from the access end 49 thereof.

The outlet end 50 of the inner housing 20 is closed off by an end wall 52. A filter mounting hub 54 projects inward from the end wall 52 into the filter receiving chamber 47 and comprises a base 55 having a first diameter and a stub end 56 of a second, reduced diameter, with a shoulder 57 formed between the base 55 and stub end 56. The filter mounting hub 54 is sized for mounting a filter 8 thereon as discussed hereafter.

A primary outlet bore 60 is formed in the filter mounting hub 54 and extends into the end wall 52. Four diverging outlet passageways 62 branch off of the primary outlet bore 60 and extend through the end wall 52. The outlet passageways 62 are spaced ninety degrees apart about an axis extending through the primary outlet bore 60.

The outlet end cap 22 includes four converging outlet passageways 64 that converge to a central outlet passageway 66 formed in a nipple 67 projecting outward or rearward from the outlet end cap 22. The converging outlet passageways 64 are similarly spaced ninety degrees apart about an axis extending through the central outlet passageway 66. An inlet end 68 of the fuel line 12 is connected to the nipple 67 with a compression fitting 70. An outlet end of the fuel line 12 is connected to the pump assembly 9 as discussed hereafter.

The outlet end cap 22, of the filter assembly 7, is secured in the outlet end 36 of the outer housing 21. The outlet end cap 22 includes a plug member 78 and an outwardly projecting mounting flange 79. The plug member 78 fits snugly within the open, outlet end 36 of the outer housing 21 with the mounting flange 79 abutting the outlet end 36 of the outer housing 21. An o-ring seal on the plug member 78 prevents leaks between the outlet end cap 22 and the outer housing 21.

The filters 8 utilized with the filter assembly 7 are formed from a pleated metal weave fabric to form a generally cylindrical filter sidewall 81 with an open interior. A first end of the filter 8 is closed by a cap 82 and a second end of the filter 8 is partially closed and converges around a flexible or resilient sealing ring 83. The sealing ring 83 is sized to snugly and removably fit over the stub end 56 of the filter mounting hub 54 with the ring 80 preferably butting against shoulder 57.

The inner housing 20 is rotatably mounted within the axial bore 37 of the outer housing 21 with the end wall 52 of the inner housing 20 abutting against an inner face 85 of the outlet end cap 22. An annular wave spring or locking ring 87 is mounted within a groove 88 formed on an inner surface of the outer housing 21 proximate the access end 35 to hold the inner housing 20 in the axial bore 37 and against the outlet end cap 22.

The inlet openings 39 formed in the outer housing 21, generally extend in spaced relation and in alignment with an axis of the axial bore 37 of the outer housing 21. The inlet openings 48 of the inner housing 20 are similarly spaced as the inlet opening bores 39 of outer housing 21. The inner housing 20 is rotatable relative to the outer housing 21 to bring the inlet openings 48 of the inner housing 20 into and out of alignment with the inlet opening bores 39 or inlet openings 42 of the outer housing 21. As best seen in FIG. 4, when pairs of inlet openings 42 and 48 are aligned, the diverging outlet passageways 62 in the inner housing 20 are similarly aligned with the converging outlet passageways 64 in the outlet end cap 22. The orientation of the inner and outer housings 20 and 21 with the inlet openings 42 and 48 aligned and the outlet passageways 62 and 64 aligned may be referred to as an aligned orientation or flow open alignment. Rotation of the inner housing 20 a quarter turn or ninety degrees relative to the outer housing 21 rotates the outlet passageways 62 out of alignment with the outlet passageways 64 and the inlet openings 48 out of alignment with the inlet openings 42, which may be referred to as a misaligned orientation or flow closed alignment.

O-ring seats or annular grooves 90 are formed in the inner face of outlet end cap 22 around each of the converging outlet passageways 64 and an O-ring 91 is seated in each groove 90. The O-rings 91 engage the outer face of the inner housing end wall 52 and form a seal around the aligned outlet passageways 62 and 64 to prevent fuel from leaking therebetween. O-ring seats 92 are also formed in an inner surface of the outer housing 21 around each inlet opening 42 by the O-ring supports 39. O-rings 93 are secured in the seats 92 to form a seal around the inlet openings 39 and 48 when aligned to prevent leaks between the inner and outer housings 20 and 21.

Rotation of the inner housing 20 is effectuated by rotating the plug 28 of the access end cap 24. The plug 28 includes an end wall 95, a cylindrical sidewall 96 and a plurality of lugs or teeth 97 projecting past the end of the sidewall 96. The lugs 97 are sized and spaced to be received in and fit snugly in the lug receivers 51 formed in the access end of the inner housing 20. In the embodiment shown there are four lug receivers 51 and four lugs 97 spaced ninety degrees apart respectively. A tool engaging structure 98 (a hex head is shown) is formed on the outer surface of the plug 28 such that the plug 28 may be rotated by a wrench or the like (not shown). It is to be understood that the tool engaging structure could be of different geometries and could include a slot or a hex shaped recess or the like for receiving an end of a tool to rotate the plug 28.

The plug 28 is sized to allow at least a portion to be inserted into the outer housing 21 until the lugs 97 engage the lug receivers 51 in the inner housing 20. More specifically the outer diameter of the portion of the plug 28 comprising the lugs 97 is sized slightly smaller than the inner diameter of the locking ring 87 to allow the lugs to pass through the locking ring 87. In addition, the outer diameter of the portion comprising the lugs 97 is greater than the inner diameter of the inner housing 20 so that the lugs 97 engage the lug receivers 51 in the inner housing 20.

The plug sidewall 96 increases in diameter between the lugs 97 and plug end wall 95 to form a shoulder 98 which may abut against the locking ring 87. However, the sidewall 96 is narrower than an inner diameter of the plug retaining ring 29 and the axial bore 37 in the outer housing 21 to allow the sidewall 96 to extend past the plug retaining ring 29 and into the access end of the outer housing 21. An O-ring 101 seated in an O-ring seat 102 formed in the plug sidewall 96 is compressed upon insertion of the plug sidewall 96 into the outer housing 21 to form a seal between the plug 28 and outer housing 21.

A circumferential flange 105 projects radially outward from the plug sidewall 96 proximate the end wall 95 and extends circumferentially therearound. The flange 105 is slightly wider or greater in diameter than the sidewall 96. A pair of tabs 106 are formed on and project radially outward from the flange 105. The tabs 106 are spaced one hundred and eighty degrees apart or on opposite sides of the plug 28. The tabs 106 cooperate with the plug retaining ring 29 to lock the plug 28 in place relative to the retaining ring 29.

The retaining ring 29 includes an inner plate 110, an outer plate 112 spaced apart by a circumferential sidewall 114. A hole 116 extends through the plates 110 and 112 and a circumferential slot 118 formed between the plates 110 and 112 opens into the hole 116. The diameter of the hole 116 extending through the outer plate is slightly wider than the diameter of the hole extending through the inner plate 110 to generally form an inwardly projecting lip or shoulder 120. Tab receiving recesses 122 are formed in the outer plate 21 around the hole 116 approximately one hundred and eighty degrees apart and sized to allow the tabs 106 to pass thereby. The tabs 106 are no thicker than the circumferential slot 118 so that once the tabs 106 are advanced past the tab receiving recesses 122 the plug 28 can be rotated to capture the tabs 106 in the slot 118.

When the plug 28 is initially inserted into the plug retaining ring 29 with the tabs 106 aligned with the tab recesses 122 and so that the lugs 97 engage the lug receivers 51, the inner and outer housings 20 and 21 are oriented in the flow closed alignment. A first stop pin 124 is inserted through the inner and outer plates 110 and 112 and across the slot 118 and radially spaced from the associated tab recess 122 a little more than forty-five degrees clockwise past a center of the associated recess 122 and in the path of rotation of one of the tabs 106 (a first tab) to prevent the plug 28 from being rotated clockwise more than forty five degrees from the position at which the tabs 106 are aligned with the tab recesses 122. Rotating the plug 28 clockwise a quarter turn rotates the inner housing 20 ninety degrees and into the flow open alignment with the outer housing 21.

A set screw or second stop 126 is threaded through a threaded bore extending through the first and second plates 110 and 112 and across the slot 118. The set screw bore (not shown) is formed just past the tab recess 122 for the second tab 106, in a clockwise direction and in a generally horizontal alignment with the first stop pin 124. Before rotation of the tabs 106 out of alignment with the tab recesses 122, the set screw 126 is backed out of the slot 118 so that the plug 28 can be rotated the forty five degrees necessary to rotate the inner housing 20 from the closed alignment to the open alignment relative to the outer housing 21. Once the plug 28 has been rotated clockwise forty five degrees relative to the plug retaining ring 29, the set screw bore extends through plates 110 and 112 just past a trailing edge of the second tab 106. The set screw 126 is then threaded inward to advance its tip across the slot 118 and preferably into inner plate 110 creating a second stop to prevent the plug 28 from rotating back counterclockwise. More specifically, engagement of a trailing edge of the second tab 106 against set screw 126 prevents the plug 28 from rotating counterclockwise and engagement of a leading edge of the first tab 106 prevents the plug 28 from rotating clockwise, holding the inner housing 20 in the open alignment with the outer housing 21.

The fuel filter is smaller in diameter than the filter access opening 17 in the sump sidewall 15, smaller in diameter than the internal diameter of the locking ring 87 and smaller in diameter than the internal diameter of the plug retaining ring 29 so that when the plug 28 is removed from the retaining ring 29 the filter 8 can be readily removed from the filter chamber 47.

The pump assembly 9 includes the fuel pump 10, a pump housing 130, a pump housing inlet end cap 132 and a pump housing discharge end cap 134. The pump housing 130 generally comprises a cylindrical sleeve 136 with an open inlet end 137 and discharge end 138 and a mounting flange 139 secured to and projecting outward from the sleeve 136 at the discharge end 138. The mounting flange 139 of the pump housing 130 is bolted against an interior surface of the sump sidewall 15 such that the pump housing 130 extends around and covers the pump access opening 18. A gasket 141 is positioned between the mounting flange 139 and the sump sidewall 15. The pump housing 130 is mounted in closely spaced relation to the outer housing 21 of the filter assembly 7.

The pump housing inlet end cap 132 is secured in the inlet end 137 of the pump housing 130 to generally seal of the inlet end 137. The pump housing inlet end cap 132 has an inlet tube or nozzle 143 projecting rearwardly or outwardly therefrom. A discharge end 144 of the fuel line 12 is connected to the inlet tube 144 by a compression fitting 145.

The discharge end cap 134 is bolted onto the discharge end of the fuel pump 10. The discharge end cap 134 includes a cylindrical sidewall 147 closed off at a discharge end by an end wall 148 with a mounting flange 149 projecting radially outward therefrom. A discharge nozzle or outlet tube 151 is formed on the discharge end cap 134 and adapted for connection thereto of a fuel line (not shown) by a compression fitting or other acceptable connection means. An inner surface of the end wall 148 of the discharge end cap 134 is preferably funnel shaped to direct fuel pumped through the pump 10 through the nozzle 151.

The pump 10 is sized for insertion into the pump housing 130 through the pump access opening 18. The pump 10 is slid into the housing 130 until the mounting flange 149 abuts against an outer surface of the sump sidewall 15. The mounting flange 149 includes a pair of hooks 154 projecting outward therefrom and one hundred and eighty degrees apart and opening sideways in the same circumferential direction and two bolt receiving apertures 156 formed therein on opposite sides of the flange 149 and between the hooks 154. Once the mounting flange 149 is slid into engagement with the sump sidewall 15, the mounting flange 149 may be rotated to advance the hooks 154 over an exposed portion of the shaft of two bolts used for connecting the pump housing 130 to the sump sidewall 15. The bolt receiving apertures 156 in the pump mounting flange 149 will then be aligned with bolt holes in the sump sidewall 15 and the pump housing mounting flange 139 through which two additional bolts may be threaded for securing the pump 10 within the pump housing 130 and to the sump sidewall 15.

A fuel return line port 160 is formed in the sump sidewall 15 on a side of the pump assembly 9 opposite the filter assembly 7. A fuel return line (not shown) may be connected to the sump 3 through the fuel return line port 160. A portion of the fuel pumped out of the pump assembly 9 is not used by the engine for combustion and is returned to the fuel tank by return line. The flow of returning fuel can be particularly high during idling of the engine. A shield 162 formed of sheet metal is mounted within the sump 3, around and in covering relationship with the pump assembly 9 separating the pump assembly 9 and the return line port 160 from the filter assembly 7 within the sump 3. The filter assembly 7 is separated from the pump assembly 9 and the return line port 160 to reduce turbulence of the fuel flowing into the filter assembly 7 through the outer housing inlet openings 42.

The shield 162 includes a first leg 164, a second leg 166 and a connecting web 168. The first leg 164 projects upward between and separates the filter assembly 7 from the pump assembly 9. The second leg 166 projects upward between and separates the pump assembly 9 from the portion of the sump 3 in which fuel is returned through port 160. The connecting web 168 connects the first and second legs 164 and 166 of the shield 162 at their upper ends and below an upper end of the sump 3 such that fuel flowing into the sump 3 from the port 160 can flow over the connecting web 168 and to the portion of the sump 3 housing the filter assembly 7. Holes 170 are formed in the second leg 166 of the shield 162 to allow fuel to flow into the portion of the sump 3 housing the pump assembly 9.

Positioning the filter assembly 7 in the sump with the inlet openings 42 of the outer housing 21 positioned just above the sump floor 16 ensures that there will always be a maximum amount of pressure or head on the fuel where it enters the filter assembly 7 to reduce the incidence of cavitation due to inadequate fuel supply. By positioning both the filter assembly 7 and the pump assembly 9 within the sump 3, the length of the fuel line 12 connecting the two can be relatively short, thereby reducing the pressure drop of fuel flowing therethrough. In addition, the fuel line 12 is preferably sized relatively large to further reduce the pressure drop therethrough, all of which ensure adequate fuel supply through the pump 10.

The fuel supply system 1 described is particularly well adapted for any application in which it is desirable to be able to readily access and remove the fuel filter and the fuel pump, which includes racing applications or other high performance applications. The fuel supply system 1 is also designed to minimize pressure drop therethrough to ensure the efficient supply of fuel to the engine.

During operation of the vehicle, the fuel filter 8 is mounted within the filter chamber 47 of the filter assembly inner housing 20 with the inner and outer filter assembly housings 20 and 21 oriented in the flow open orientation. The pump 10, mounted within the pump housing 130, draws fuel from the sump 3 through the aligned inlet openings 42 and 48 of outer and inner filter housings 21 and 20 respectively. The fuel flows through the pleated sidewall 81 of the filter 8, through the primary outlet bore 60 in the filter mounting hub 54 and out the diverging outlet passageways 62 in the inner housing end wall 52. The diverging outlet passageways 62 direct the fuel through the central outlet passageway 66 in the outlet end cap 22 and into the fuel line 12. The fuel is then drawn from the fuel line 12 through the pump 10 which then discharges the fuel under pressure through the discharge end cap nozzle 151 and to the fuel supply line (not shown) which supplies the fuel to the engine.

To replace the fuel filter 8, and with the pump turned off, the set screw 126 is backed out of the slot 118 in the plug retaining ring 29. Using an appropriate tool, such a sufficiently sized socket, the plug 28 is rotated a quarter turn counter-clockwise (in the embodiment shown) until the tabs 106 on plug 28 are aligned with the tab recesses 122 in the plug retaining ring 29. The plug 28 can then be pulled out from the retaining ring 29. Rotation of the plug 28, a quarter turn, simultaneously rotates the inner filter housing 20 forty-five degrees relative to the outer filter housing 21 or to the flow closed or misaligned orientation. As discussed above, the inner housing 20 rotates with the plug 28 due to the engagement of the lugs 97 on plug 28 with lug receivers 51 on inner housing 20. With the inlet openings 48 in the inner housing 20 misaligned with the inlet openings 42 in the outer housing 21 fuel cannot flow from the sump 3 into the filter assembly 7. Similarly with the diverging outlet passageways 62 in the inner housing 20 misaligned with the converging outlet passageways 62 in the outer housing 21, fuel cannot flow back into the filter assembly 7 from the fuel line 12. Therefore only the fuel that is in the inner filter housing 20, when the inner and outer housings are advanced to the misaligned orientation, will spill out of the filter assembly 7 when the plug 28 is removed.

Once the operator removes the plug 28, the filter 8 can be removed through the access end 36 of the outer housing 21, the access opening 17 in the sump sidewall and through the plug retaining ring 29. A new filter 8 is then inserted back into the filter chamber 47 by sliding the filter 8 through the same openings and until the sealing ring 83 of the filter 8 slides over and engages the filter mounting hub 54 and abuts against the shoulder 57 associated therewith.

The operator then reinserts the plug 28 by aligning tabs 106 on the plug 28 with the tab recesses 122 in the plug retaining ring 29, advancing the plug 28 inward until the tabs 106 align with the circumferential slot 118 in the retaining ring 29 and then rotating the plug 28 clockwise forty-five degrees until a leading edge of the first tab 106 engages the stop pin 124. Advancement of the plug 28 into the retaining ring 29 advances the lugs 97 on plug 28 back into alignment with the lug receivers 51 in the inner housing 20. Rotation of the plug 28 forty-five degrees secures the plug 28 within the retaining ring 29 and rotates the inner filter housing 20 into the flow open alignment with the outer filter housing 21 allowing fuel to once again be pumped through the filter assembly 7 and to the pump assembly 9.

If the fuel pump 10 is to be replaced it is preferably done at the same time that the fuel filter 8 is being replaced. If only the fuel pump 10 is to be replaced, the plug 28 for the filter assembly 7 is still rotated forty-five degrees to rotate the inner housing to the flow closed alignment with the outer housing preventing fuel from flowing from the sump into the fuel supply line and out the pump housing 130. The bolts extending through the bolt receiving apertures 156 in the pump discharge end cap 134 are removed and the two bolts engaged by the hooks 154 on the end cap 134 are loosened until the end cap 134 and the pump 10 can be rotated to disengage the hooks 154 from the bolts. The pump 10 can then be removed from the pump housing 130 and a substitute pump inserted to replace the first and bolted in place as described previously. Once the new pump 10 and any new filters 8 are installed, the plug 28 is rotated back forty five degrees to advance the inlet and outlet filter housings 20 and 21 back to the aligned or flow open orientation to allow the fuel supply system 1 to supply fuel to the engine.

Submerging both the filter assembly 7 and the pump assembly 9 in the sump 3 allows efficient filtering and pumping capacity. The fuel supply system 1 disclosed is capable of pumping 2,000 lb/hr at pump pressure 45 psi with pressure drop on the system as low as 0.5 psi. Submerging the pump 10 in the sump 3, also, significantly reduces the noise level resulting from operation of the pump.

It is to be understood that while certain forms of the present invention have been illustrated and described herein, it is not to be limited to the specific forms, process steps or arrangement of parts described and shown and that the invention should be limited only by the claims. For example, it is to be understood that the described fuel supply system may be used to supply filtered liquid other then fuel and may also be referred to as a fluid supply system. The system may be used in applications other than automobiles. It is also foreseen that the pump assembly could be mounted outside of the sump 3. It is also to be understood that as used herein, the term sump is simply intended to refer to a portion of the tank containing the fluid to be filtered and pumped that is generally located lower than the rest of the tank to allow the fluid to drain to the sump for pumping out of the tank. It is also to be understood that the fluid supply system as disclosed could be utilized with a wide variety of tanks or vessels.

What is claimed is:

1. A fuel supply system for a motor vehicle having an internal combustion engine with fuel supplied from a fuel tank, said fuel supply system comprising:
    a filter housing mounted within the fuel tank and around a filter access opening formed in the fuel tank; said filter housing having a filter chamber and an open access end aligned with the filter access opening; said filter housing further including a fuel inlet and a fuel outlet which open into said filter chamber;
    a filter removably insertable within said filter chamber through said filter access opening; said filter securable within said filter chamber to separate said fuel inlet from said fuel outlet;
    a filter housing plug removably securable to said filter housing to selectively open and close said filter access opening;
    a pump housing mounted within the fuel tank and around a pump access opening formed in the fuel tank, said pump access opening formed through said fuel tank separate and apart from said filter access opening; a fuel pump removably securable within said pump housing;
    a fuel line connecting said fuel outlet of said filter housing to an inlet of said pump housing.

2. A fuel supply system for a motor vehicle having an internal combustion engine with fuel supplied from a fuel tank, said fuel supply system comprising:
    a filter housing mounted within the fuel tank and around a filter access opening formed in the fuel tank; said filter housing having a filter chamber and an open access end aligned with the filter access opening; said filter housing further including a fuel inlet and a fuel outlet which open into said filter chamber;
    a filter removably insertable within said filter chamber through said filter access opening; said filter securable within said filter chamber to separate said fuel inlet from said fuel outlet;
    a filter housing plug removably securable to said filter housing to selectively open and close said filter access opening; wherein said filter housing plug is rotatably connected to said filter housing and rotatable between a removable position and a nonremovable position wherein advancement of said filter housing plug to said removable position closes said fuel inlet and said fuel outlet and advancement of said filter housing plug to said nonremovable position opens said fuel inlet and said fuel outlet;
    a pump housing mounted within the fuel tank and around a pump access opening formed in the fuel tank, said pump access opening formed through said fuel tank separate and apart from said filter access opening; a fuel pump removably securable within said pump housing; and
    a fuel line connecting said fuel outlet of said filter housing to an inlet of said pump housing.

3. A fluid filtering system securable within a tank from which fluid is to be pumped; said fluid filtering system comprising:
    an outer filter housing having an open access end, a fluid inlet and a fluid outlet;
    an inner filter housing rotatably mounted within said outer filter housing and having an open access end, a filter chamber, a fluid inlet and a fluid outlet formed therein; said fluid inlet and said fluid outlet opening into said filter chamber; said inner filter housing rotatable between an aligned orientation wherein said fluid inlet and said fluid outlet in said inner housing are aligned with said fluid inlet and said fluid outlet in said outer housing and a misaligned orientation wherein said fluid inlet and said fluid outlet in said inner housing are misaligned with said fluid inlet and said fluid outlet in said outer housing;
    said outer filter housing mounted within the tank and around a filter access opening formed in a wall of the tank;
    a filter removably insertable within said filter chamber through said filter access openings in said inner and outer filter housings; said filter securable within said filter chamber to separate said fluid inlet from said fluid outlet; and a closure member removably connectable to said inner filter housing and in covering relationship with said open access end of said inner filter housing and rotatable between a first position wherein said closure member is removable from said inner filter housing and said inner filter housing and said outer filter housing are in said aligned position and a second position wherein said closure member is held in covering relationship with said open access end of said inner filter housing and said inner filter housing and said outer filter housing are in said misaligned position.

4. The fluid filtering system as in claim 3 wherein said inner filter housing fluid inlet is formed in a cylindrical sidewall of said inner filter housing and said outer filter housing fluid inlet is formed in a cylindrical sidewall of said outer filter housing; said inner housing includes an outlet end wall opposite said open access end; said outlet end wall having at least one outlet passageway extending therethrough with an outlet end of said outlet passageway opening through said outlet end wall in spaced relation from a central axis of said outlet end wall; said outer filter housing having an outlet end cap extending across an outlet end thereof and in closely spaced relation to said inner filter housing outlet end wall; said outlet end cap having a discharge passageway formed therein with an inlet end of said discharge passageway opening through said outlet end cap in a spaced relation from a central axis of said outlet end cap corresponding to the spaced relationship of said outlet end of said outlet passageway; such that rotation of said inner and outer filter housings to said aligned orientation aligns said outlet end of said outlet passageway with said inlet end of said discharge passageway and rotation of said inner and outer filter housings to said misaligned orientation misaligns said outlet end of said outlet passageway with said inlet end of said discharge passageway.

5. The fuel supply system as in claim 1 wherein said pump access opening and said filter access opening are formed in a sidewall of said fuel tank.

6. The fuel supply system as in claim 1 in combination with the fuel tank.

7. The fuel supply system as in claim 2 wherein said pump access opening and said filter access opening are formed in a sidewall of said fuel tank.

8. The fuel supply system as in claim 2 in combination with the fuel tank.

9. The fluid filtering system as in claim 3 in combination with the tank.

* * * * *